US012759483B2

(12) United States Patent
Kogure et al.

(10) Patent No.: US 12,759,483 B2
(45) Date of Patent: Oct. 13, 2026

(54) WIRE HARNESS

(71) Applicant: Yazaki Corporation, Tokyo (JP)

(72) Inventors: Naoto Kogure, Shizuoka (JP); Hikaru Sano, Shizuoka (JP)

(73) Assignee: Yazaki Corporation, Tokyo (JP)

(*) Notice: Subject to any disclaimer, the term of this patent is extended or adjusted under 35 U.S.C. 154(b) by 203 days.

(21) Appl. No.: 18/737,120

(22) Filed: Jun. 7, 2024

(65) Prior Publication Data

US 2024/0326721 A1 Oct. 3, 2024

Related U.S. Application Data

(63) Continuation of application No. PCT/JP2023/005914, filed on Feb. 20, 2023.

(30) Foreign Application Priority Data

Feb. 28, 2022 (JP) ................................ 2022-028842

(51) Int. Cl.
*B60R 16/02* (2006.01)
*H02G 11/00* (2006.01)

(52) U.S. Cl.
CPC ......... *B60R 16/0215* (2013.01); *H02G 11/00* (2013.01)

(58) Field of Classification Search
None
See application file for complete search history.

(56) References Cited

U.S. PATENT DOCUMENTS

| | | | | |
|---|---|---|---|---|
| 11,766,974 | B2 * | 9/2023 | Long | B60N 2/0264 174/72 A |
| 11,780,387 | B2 * | 10/2023 | Kitahara | B60R 16/0215 174/72 A |
| 2005/0095903 | A1 * | 5/2005 | Stenzel | H02G 3/0475 439/501 |
| 2007/0148992 | A1 * | 6/2007 | Sato | B60R 16/0207 439/34 |
| 2007/0148994 | A1 * | 6/2007 | Sato | B60R 16/0215 439/34 |
| 2014/0332265 | A1 * | 11/2014 | Nagayasu | H02G 11/00 174/72 A |
| 2019/0071035 | A1 | 3/2019 | Sekino et al. | |

(Continued)

FOREIGN PATENT DOCUMENTS

| | | |
|---|---|---|
| JP | 2007-176232 A | 7/2007 |
| JP | 2007-283949 A | 11/2007 |
| JP | 2009-213315 A | 9/2009 |

(Continued)

*Primary Examiner* — Krystal Robinson
(74) *Attorney, Agent, or Firm* — Sughrue Mion, PLLC

(57) ABSTRACT

A wire harness includes: a first protector that is disposed on a first link that is fixed, and includes a first cylindrical portion; a second protector that is disposed on a second link rotatable relative to the first link; an exterior member having a flexible cylindrical shape that includes a first end portion disposed in the first cylindrical portion and a second end portion disposed in the second protector; an electric wire that is inserted through each of the first protector, the second protector, and the exterior member and is routed in the second link; and a movable structure that allows the first end portion to move relative to the first link along an axial direction of the first cylindrical portion.

9 Claims, 10 Drawing Sheets

(56) References Cited

U.S. PATENT DOCUMENTS

2023/0271568 A1* 8/2023 Maruchi .................. H02G 3/03
174/72 A
2023/0271574 A1* 8/2023 Kogure ...................... B60J 5/06
174/72 A

FOREIGN PATENT DOCUMENTS

JP 2013-31300 A 2/2013
JP 2019-47626 A 3/2019

* cited by examiner

WIRE HARNESS

CROSS-REFERENCE TO RELATED APPLICATION

This application is a continuation application of International Application No. PCT/JP2023/005914 filed on Feb. 20, 2023 which claims the benefit of priority from Japanese Patent Application No. 2022-028842 filed on Feb. 28, 2022 and designating the U.S., the entire contents of which are incorporated herein by reference.

BACKGROUND OF THE INVENTION

1. Field of the Invention

The present invention relates to a wire harness.

2. Description of the Related Art

Conventionally, there is a technique of accommodating an extra length of a wire harness. Japanese Patent Application Laid-open No. 2009-213315 A discloses an extra length accommodating structure of a wire harness in which with respect to a first link rotatably supported by a shaft portion on a base and a second link rotatably supported by a shaft portion on a distal end side of the first link, a harness protector is disposed on the first link while being offset from a center of each shaft portion, a wire harness is slidably inserted into the harness protector, one side of the wire harness is fixed to a harness fixation portion on a base side, and an other side of the wire harness is fixed to a harness fixation portion on a second link side.

There is room for improvement in the wire harness that follows the rotational operation of a link mechanism. For example, in a case where both ends of an exterior member housing an electric wire are fixed to different links, there is a possibility that a load on the exterior member due to the rotational operation increases.

SUMMARY OF THE INVENTION

An object of the present invention is to provide a wire harness capable of reducing a load on an exterior member due to a rotational operation of a link mechanism.

In order to solve the above mentioned problems and achieve the object, a wire harness according to one aspect of the present invention includes a first protector that is disposed on a first link that is fixed, and includes a first cylindrical portion; a second protector that is disposed on a second link rotatable relative to the first link; an exterior member having a flexible cylindrical shape that includes a first end portion disposed in the first cylindrical portion and a second end portion disposed in the second protector; an electric wire that is inserted through each of the first protector, the second protector, and the exterior member and is routed in the second link; and a movable structure that allows the first end portion to move relative to the first link along an axial direction of the first cylindrical portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a wire harness according to embodiments of the present invention will be described in detail with reference to the drawings. Note that the present invention is not limited to the embodiments. In addition, the components in the embodiments described below include those that can be easily assumed by those skilled in the art or those that are substantially the same.

First Embodiment

Figure 1:
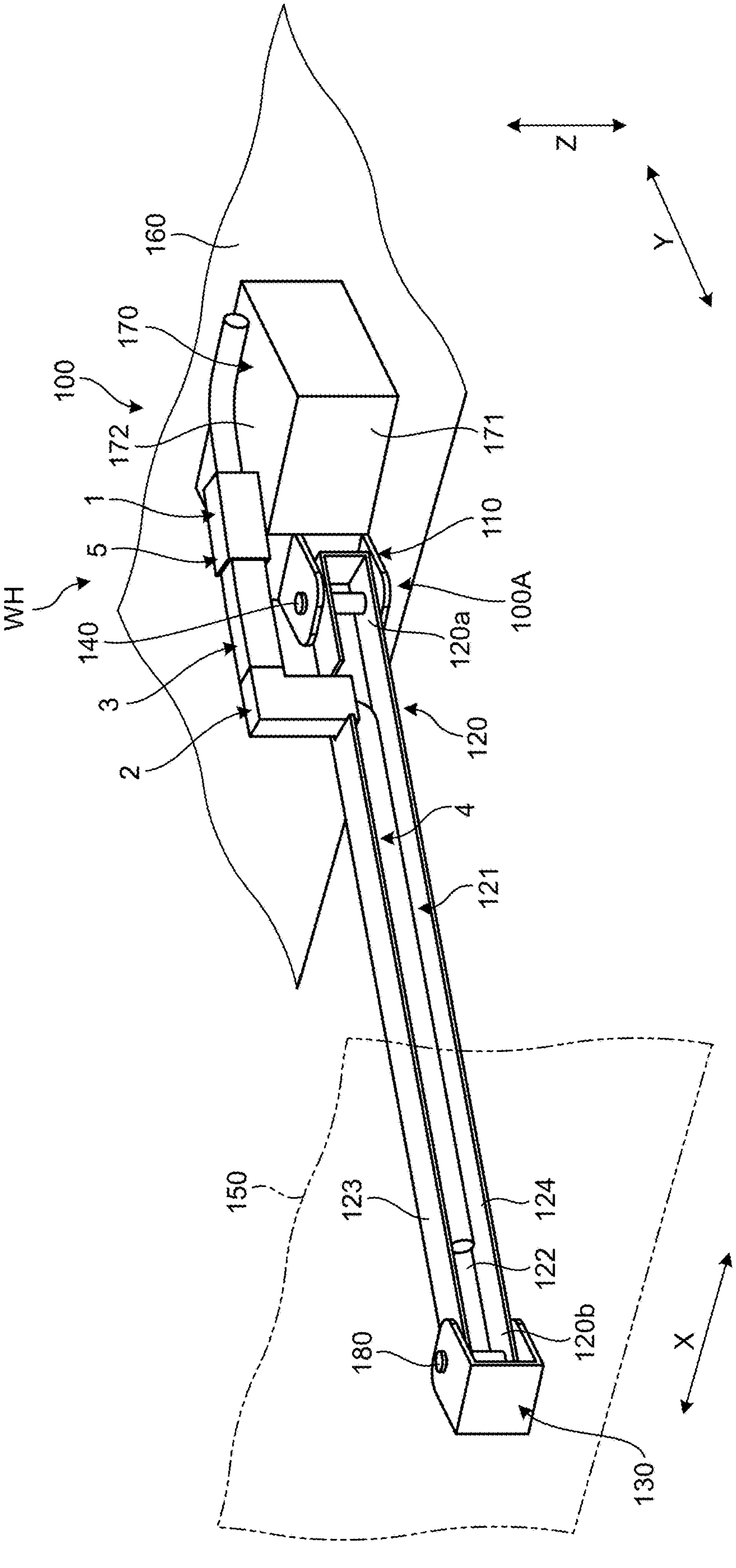
FIG. 1 is a perspective diagram illustrating a wire harness according to a first embodiment.
Figure 3:
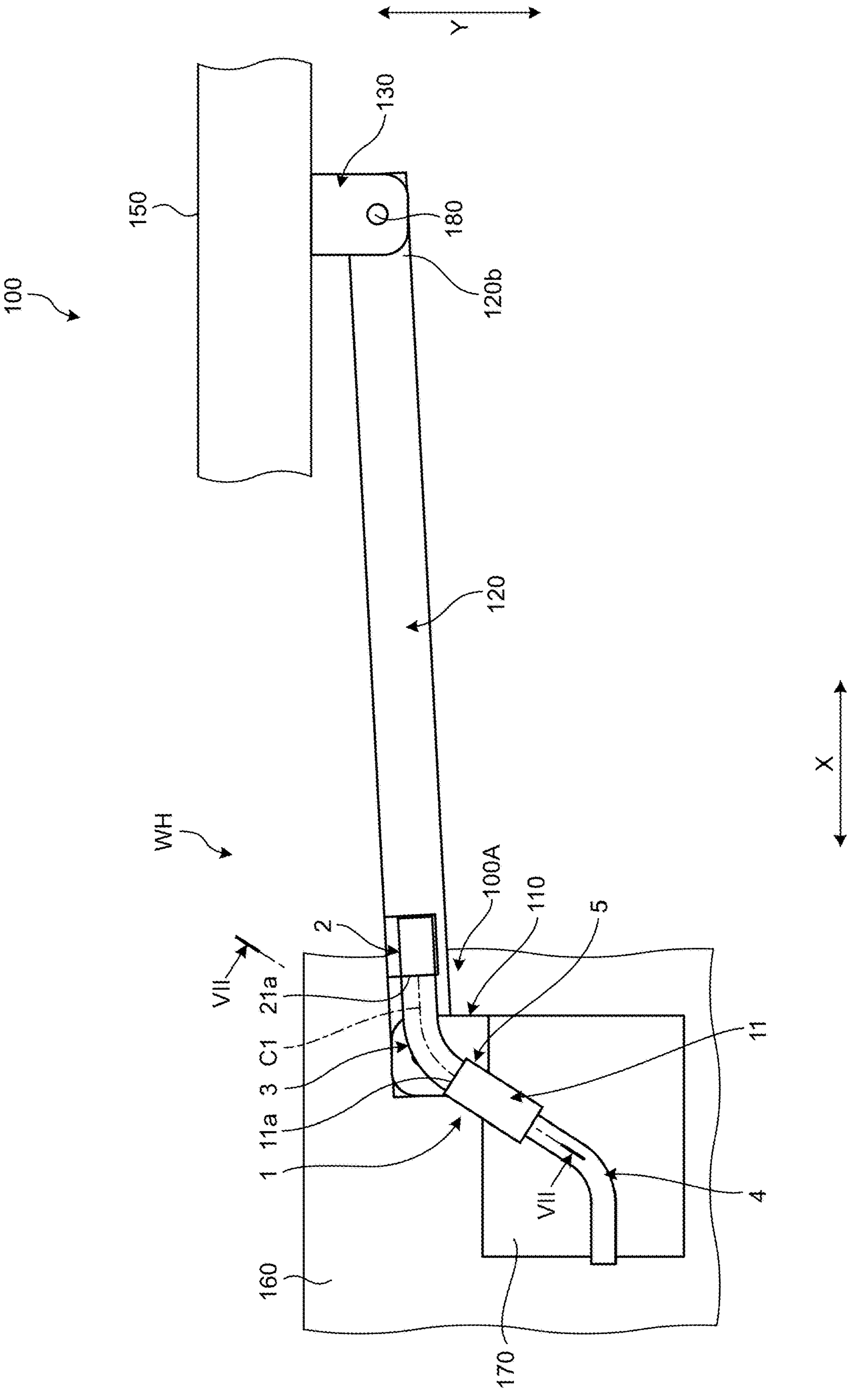
FIG. 3 is a plan diagram illustrating a wire harness in a fully closed position.
Figure 4:
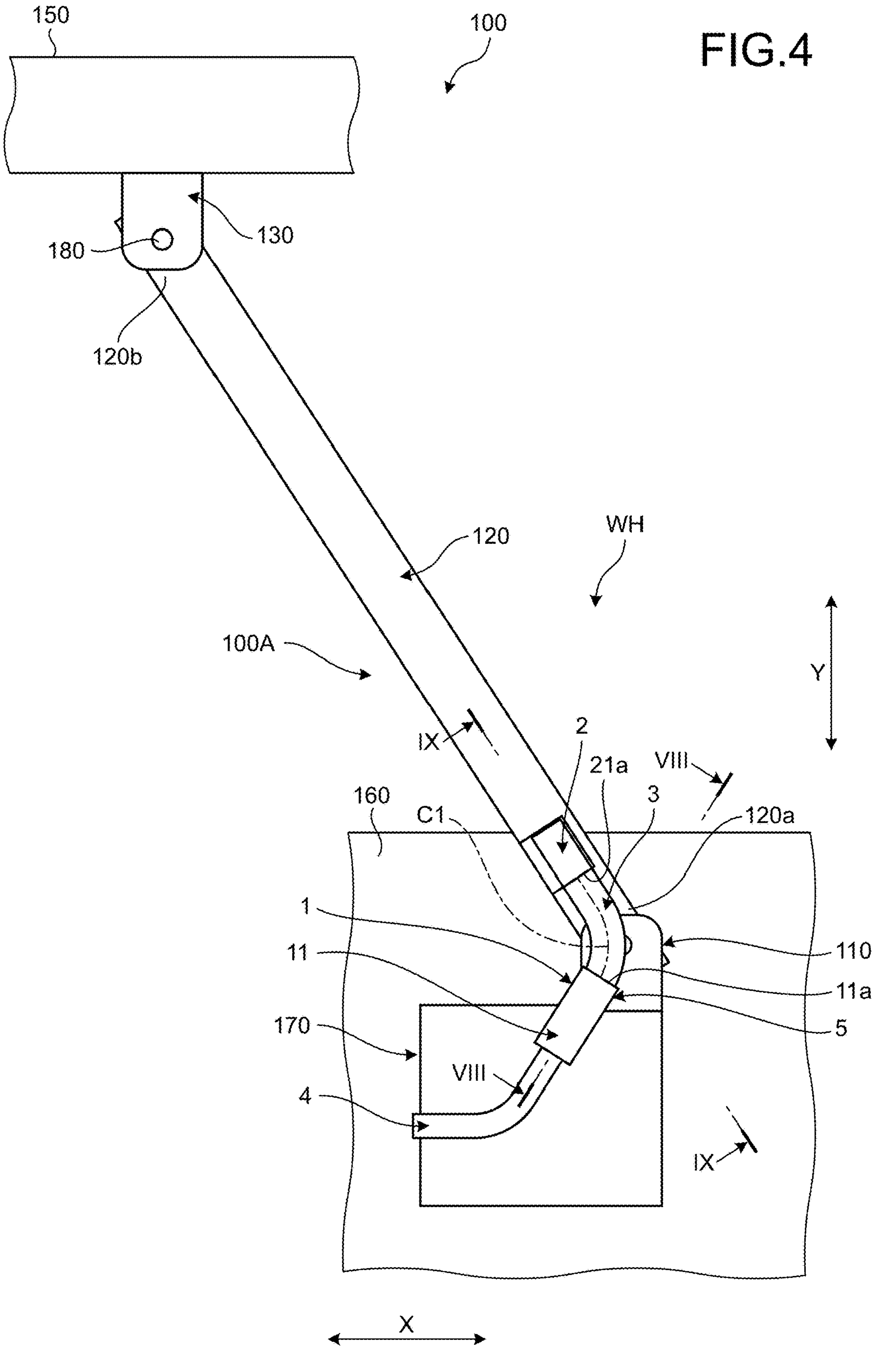
FIG. 4 is a plan diagram illustrating a wire harness in a fully open position.
Figure 5:
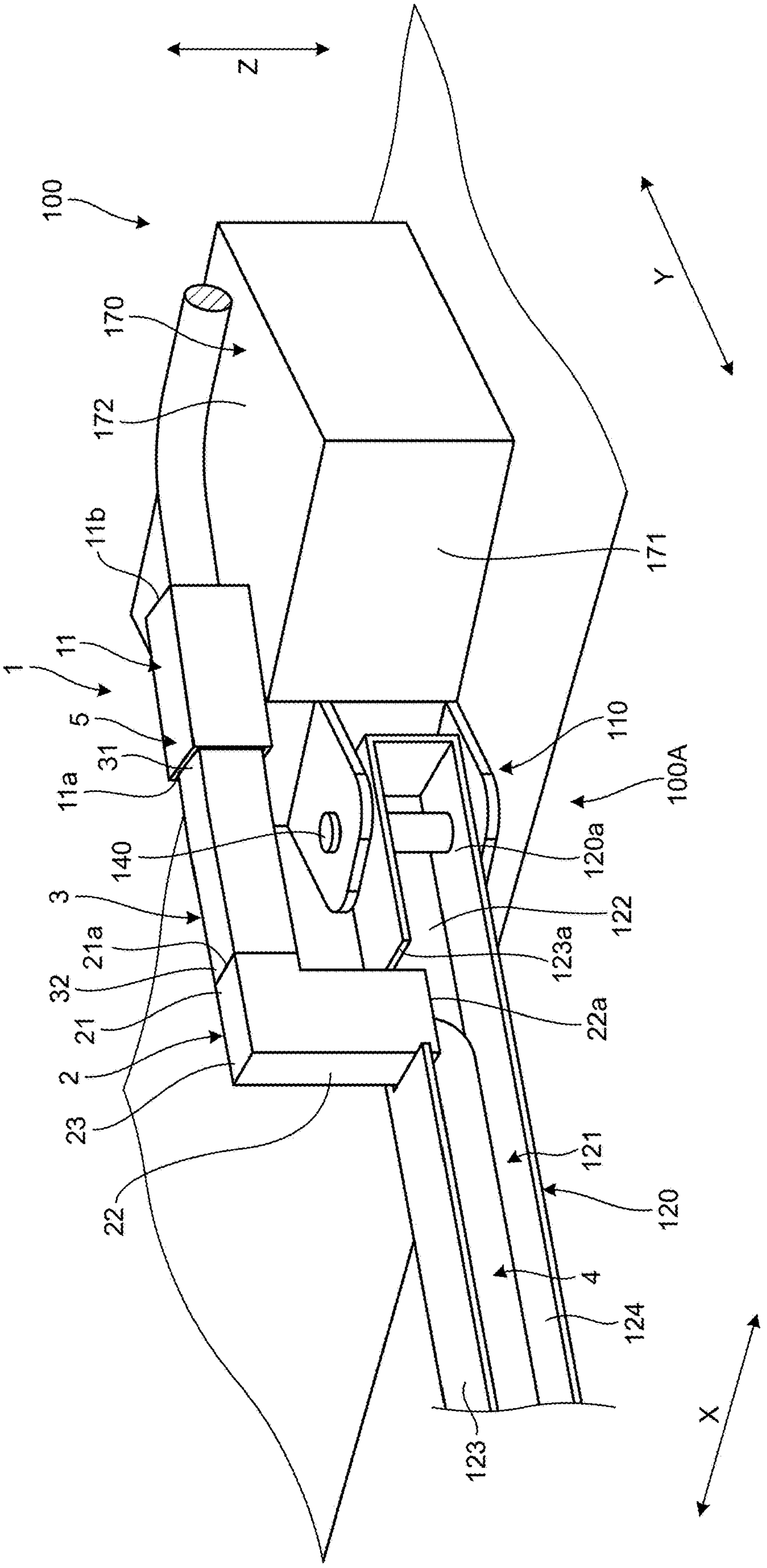
FIG. 5 is an enlarged perspective diagram of the wire harness according to the first embodiment.

A first embodiment will be described with reference to FIGS. 1 to 9. The present embodiment relates to a wire harness. FIG. 1 is a perspective diagram illustrating a wire harness according to the first embodiment, FIG. 2 is a plan diagram illustrating the wire harness in a half-open position, FIG. 3 is a plan diagram illustrating the wire harness in a fully closed position, FIG. 4 is a plan diagram illustrating the wire harness in the fully open position, FIG. 5 is an enlarged perspective diagram of the wire harness according to the first embodiment, and FIGS. 6 to 9 are cross-sectional diagrams of the wire harness according to the first embodiment.

Figure 2:
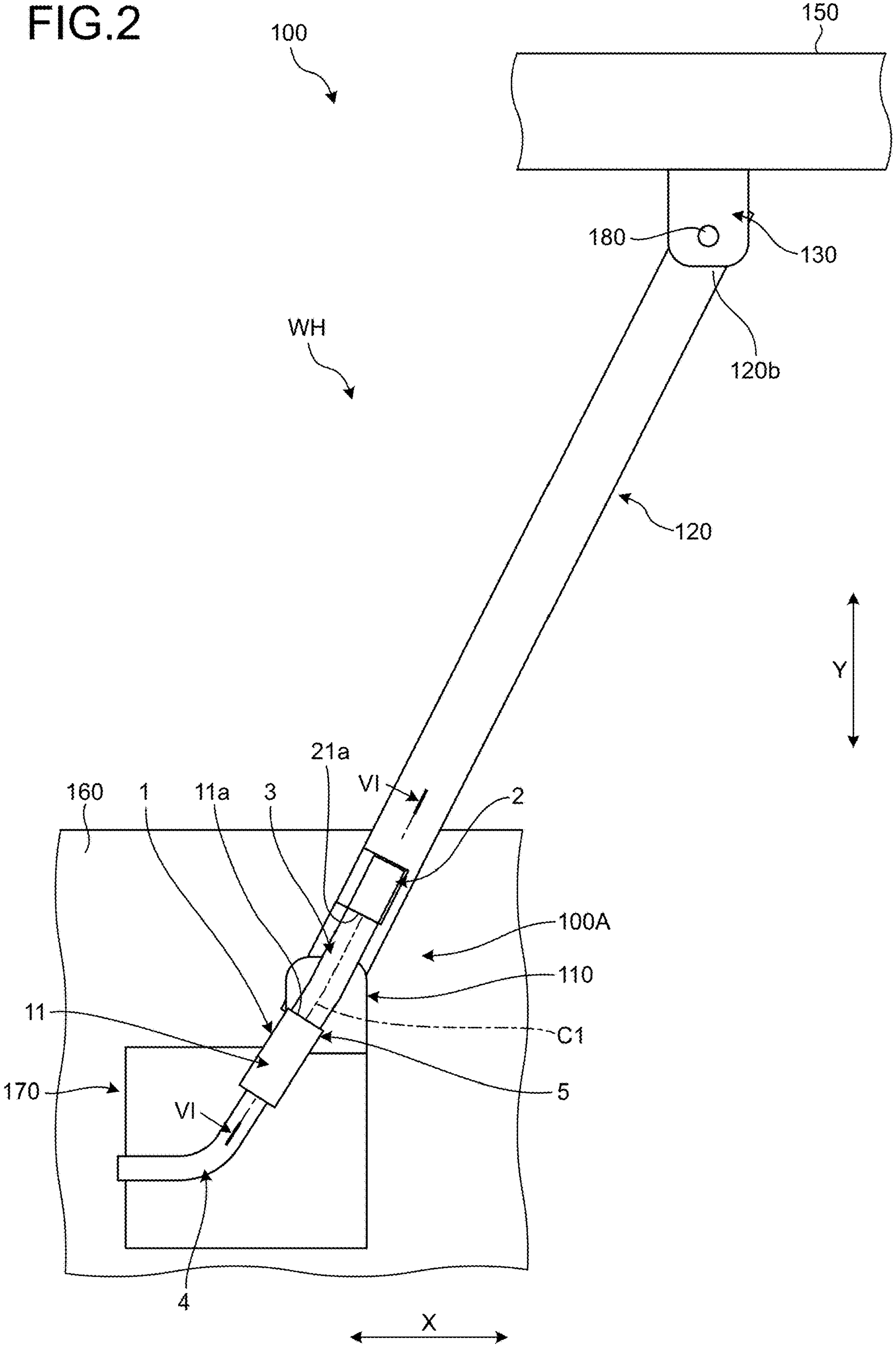
FIG. 2 is a plan diagram illustrating a wire harness in a half-open position.
Figure 6:
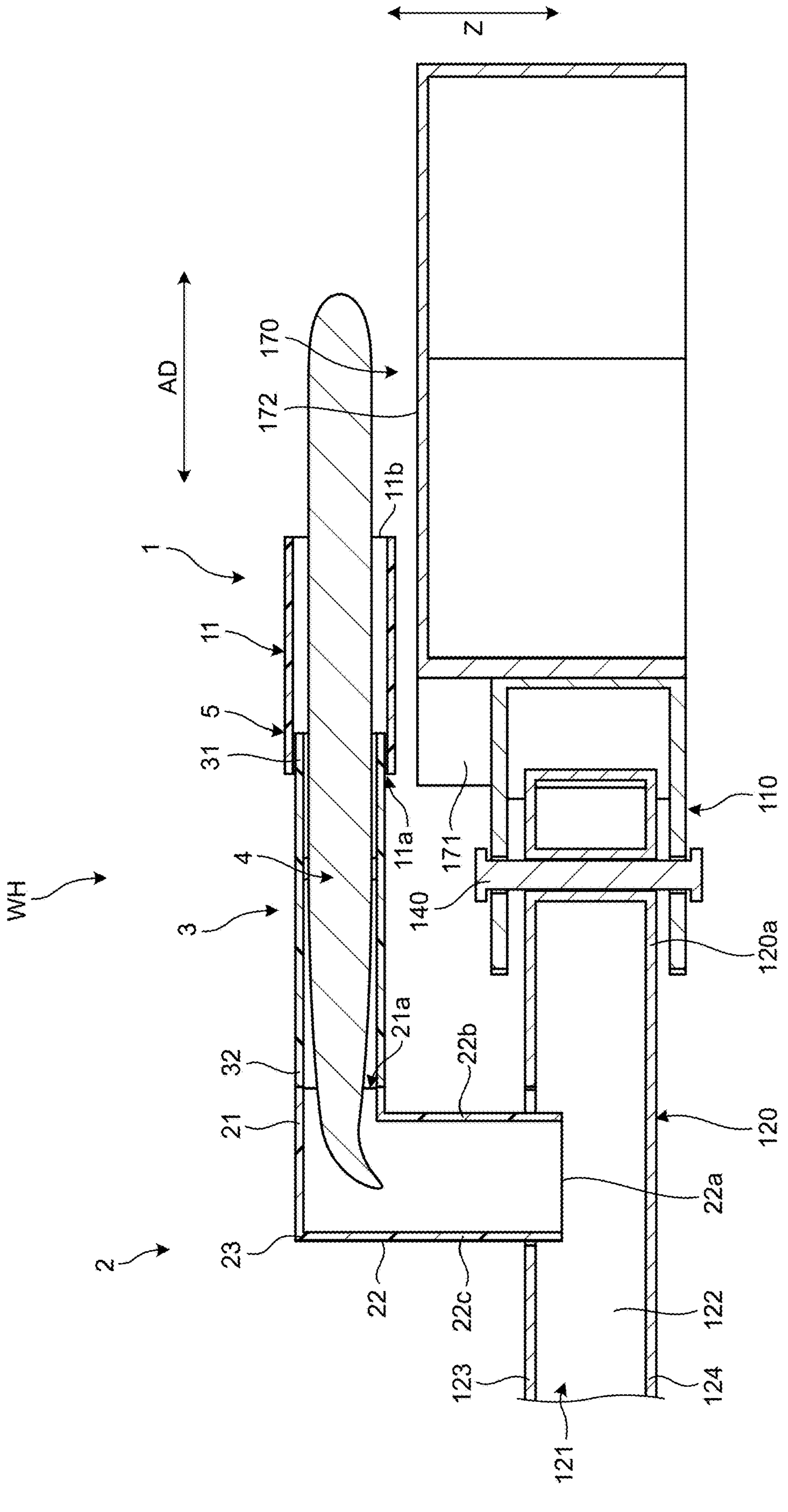
FIG. 6 is a cross-sectional diagram of the wire harness according to the first embodiment.
Figure 7:
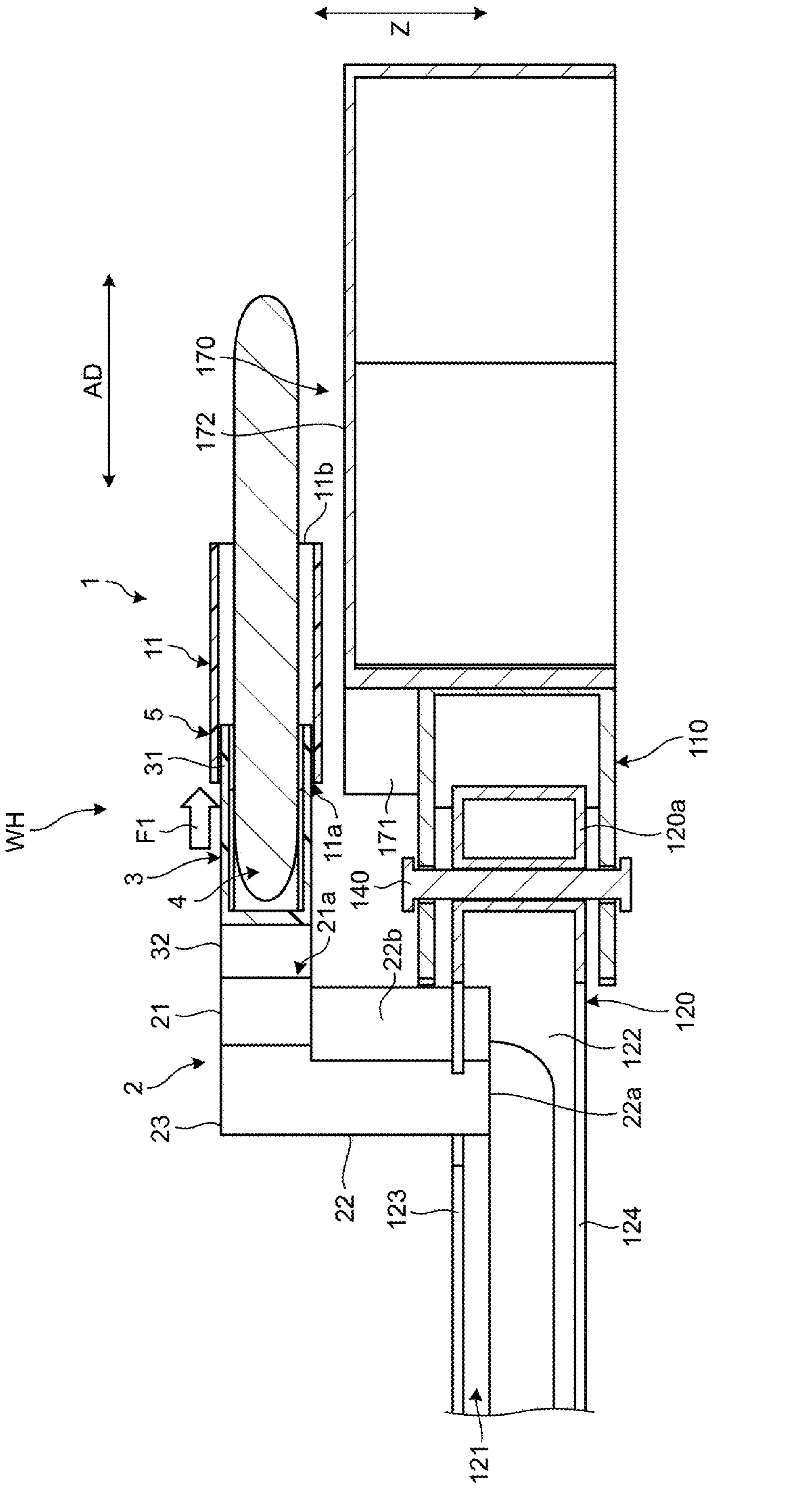
FIG. 7 is a cross-sectional diagram of the wire harness according to the first embodiment.
Figure 8:
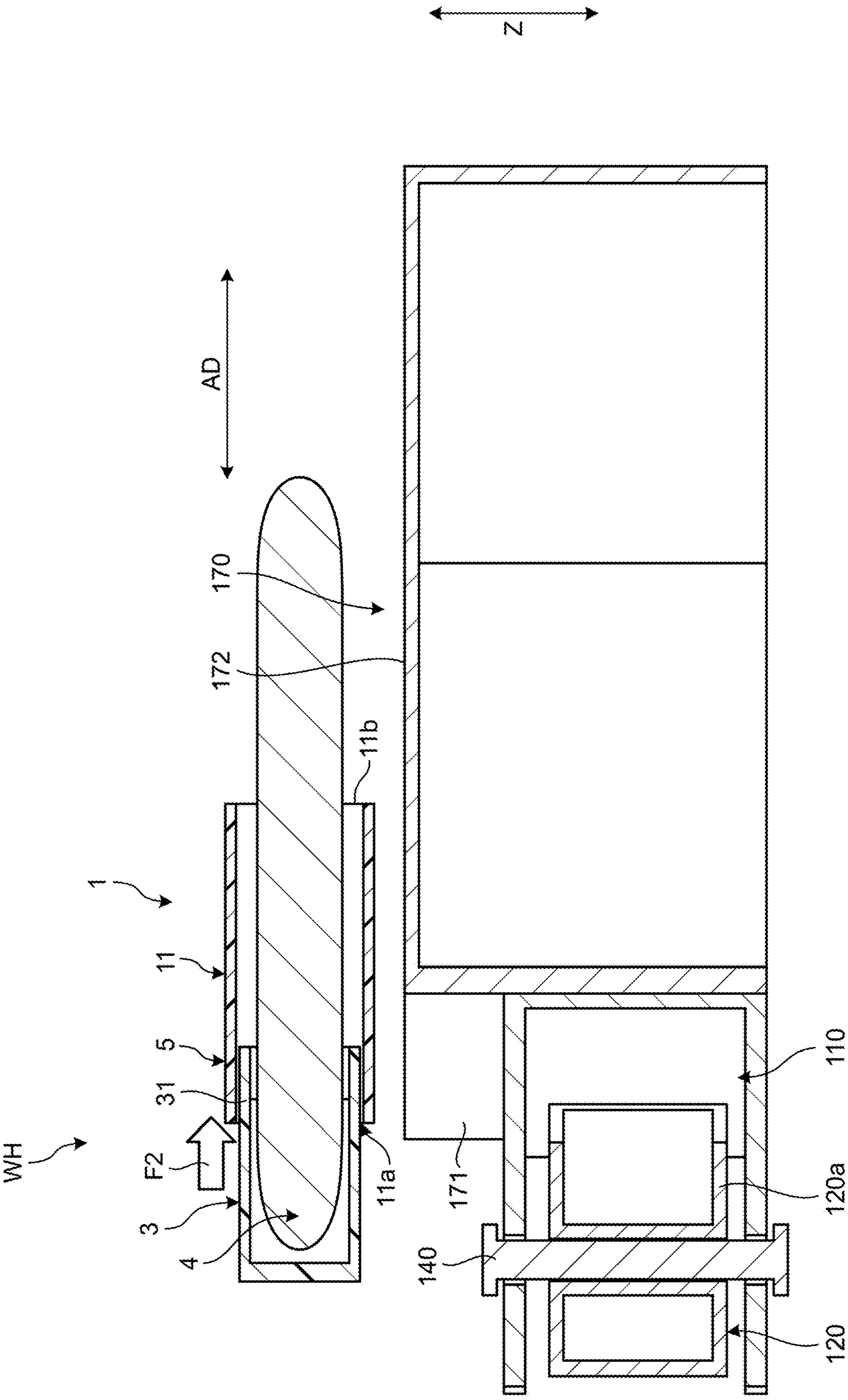
FIG. 8 is a cross-sectional diagram of the wire harness according to the first embodiment.
Figure 9:
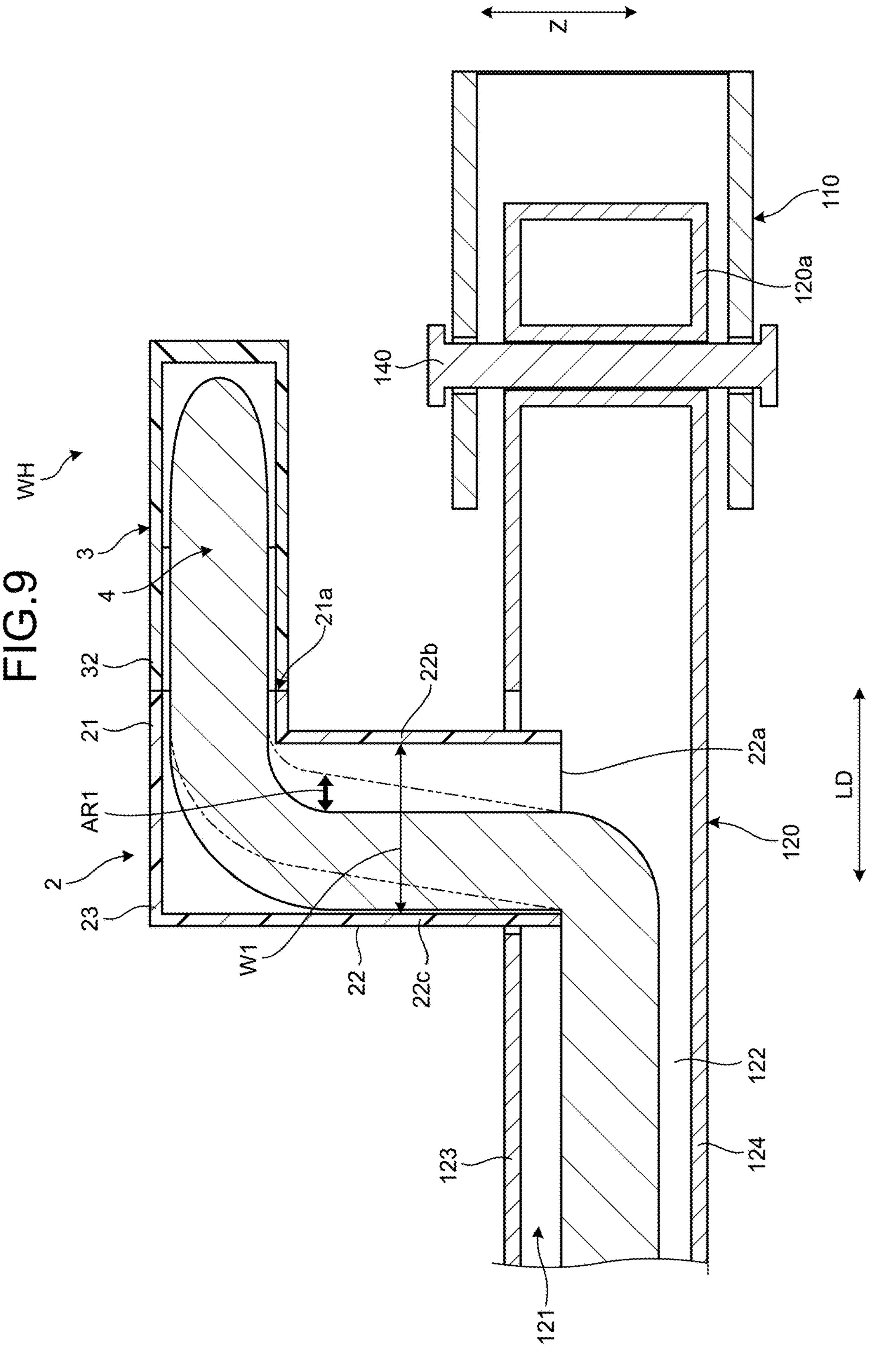
FIG. 9 is a cross-sectional diagram of the wire harness according to the first embodiment.

FIG. 6 illustrates a cross section taken along line VI-VI in FIG. 2. FIG. 7 illustrates a cross section taken along line VII-VII in FIG. 3. FIG. 8 illustrates a cross section taken along line VIII-VIII in FIG. 4. FIG. 9 illustrates a cross section taken along line IX-IX in FIG. 4.

As illustrated in FIG. 1, a wire harness WH of the present embodiment includes a first protector 1, a second protector 2, an exterior member 3, an electric wire 4, and a movable structure 5. The wire harness WH of the present embodiment is applied to, for example, a link mechanism 100A of a vehicle 100. The illustrated link mechanism 100A constitutes an opening and closing device that opens and closes a door 150 of the vehicle 100.

The link mechanism 100A includes a first link 110, a second link 120, a third link 130, and rotation shafts 140 and 180. The first link 110, the second link 120, and the third link 130 are formed of, for example, a metal plate. The first link 110 is a member fixed to a vehicle body 160 of the vehicle 100. The vehicle body 160 is provided with a support portion 170. The shape of the illustrated support portion 170 is a substantially rectangular parallelepiped shape. The first link 110 is fixed to a side surface 171 of the support portion 170 that faces a vehicle width direction Y. The first link 110 is bent in a substantially U shape and is opened in a vehicle width direction Y.

The second link 120 is a member that rotates relative to the first link 110. The second link 120 is formed in a groove shape and has an internal space 121 in which the electric wire 4 is routed. The second link 120 has a bottom wall 122, a first sidewall 123, and a second sidewall 124. The first sidewall 123 and the second sidewall 124 are erected from edges of the bottom wall 122. The first sidewall 123 and the second sidewall 124 face each other in a width direction of the bottom wall 122. The bottom wall 122 and the two sidewalls 123 and 124 form the internal space 121. The illustrated second link 120 is disposed with the first sidewall 123 facing upward in a vehicle up-down direction Z and the second sidewall 124 facing downward.

The second link 120 has a base portion 120*a* and a distal end portion 120*b*. The base portion 120*a* is positioned at a first end portion of the second link 120 in the longitudinal direction. The distal end portion 120*b* is positioned at a second end portion of the second link 120 in the longitudinal direction. The base portion 120*a* is rotatably supported by the first link 110 via the rotation shaft 140. More specifically, the base portion 120*a* is inserted into the first link 110. The rotation shaft 140 penetrates the first sidewall 123 and the second sidewall 124 of the second link 120 and rotatably supports the second link 120. Both ends of the rotation shaft 140 are supported by the first link 110. An axial direction of the illustrated rotation shaft 140 is the vehicle up-down direction Z.

The second link 120 can rotate relative to the first link 110 about the rotation shaft 140. As illustrated in FIGS. 2 to 4, the second link 120 rotates so as to move the distal end portion 120*b* in a vehicle front-rear direction X. FIGS. 1 and 2 illustrate the link mechanism 100A when the door 150 is in the half-open position, FIG. 3 illustrates the link mechanism 100A when the door 150 is in the fully closed position, and FIG. 4 illustrates the link mechanism 100A when the door 150 is in the fully open position.

The third link 130 is coupled to the distal end portion 120*b* of the second link 120. The third link 130 is rotatably supported by the second link 120 via the rotation shaft 180. The third link 130 is connected to the door 150.

The first protector 1 and the second protector 2 are members that protect the electric wire 4 and restrict the path of the electric wire 4. The first protector 1 and the second protector 2 are molded from, for example, an insulating synthetic resin.

As illustrated in FIG. 5, the first protector 1 is disposed on the support portion 170. The illustrated first protector 1 is fixed to a top surface 172 of the support portion 170 that faces an upper side of the vehicle. The first protector 1 includes a first cylindrical portion 11 having a cylindrical shape. The illustrated first cylindrical portion 11 has a rectangular cylindrical shape and extends linearly.

The first cylindrical portion 11 has openings 11*a* and 11*b*. The opening 11*a* faces the rotation shaft 140 side. The first protector 1 of the present embodiment is disposed such that the rotation shaft 140 is positioned on an extension line of the first cylindrical portion 11 in plan view. For example, the first protector 1 is disposed such that a central axis of the first cylindrical portion 11 intersects a central axis of the rotation shaft 140. The central axis of the first cylindrical portion 11 and the central axis of the rotation shaft 140 may be orthogonal to each other. The opening 11*b* faces a side opposite to the rotation shaft 140 side.

The second protector 2 is disposed on the second link 120. The first sidewall 123 of the second link 120 is provided with a cutout 123*a*. The cutout 123*a* is disposed in the base portion 120*a* or disposed in the vicinity of the base portion 120*a*. The shape of the cutout 123*a* in plan view is, for example, rectangular. The second protector 2 is disposed in the cutout 123*a* and is held by the cutout 123*a*.

The second protector 2 includes a second cylindrical portion 21, a third cylindrical portion 22, and a bent portion 23. The second cylindrical portion 21, the third cylindrical portion 22, and the bent portion 23 are each formed in a rectangular cylindrical shape. The second cylindrical portion 21 extends in the longitudinal direction of the second link 120 and opens toward the rotation shaft 140 side. That is, the second cylindrical portion 21 has an opening 21*a* facing the rotation shaft 140 side. The second protector 2 of the present embodiment is fixed to the second link 120 such that the rotation shaft 140 is positioned on an extension line of the second cylindrical portion 21 in plan view. For example, the second protector 2 is disposed such that a central axis of the second cylindrical portion 21 intersects the central axis of the rotation shaft 140. The central axis of the second cylindrical portion 21 and the central axis of the rotation shaft 140 may be orthogonal to each other.

The third cylindrical portion 22 extends in a direction orthogonal to the longitudinal direction of the second link 120 and is fitted in the cutout 123*a*. The illustrated third cylindrical portion 22 extends in the vehicle up-down direction Z. The third cylindrical portion 22 has an opening 22*a* facing the internal space 121 of the second link 120. The opening 22*a* faces the second sidewall 124.

The bent portion 23 is positioned between the second cylindrical portion 21 and the third cylindrical portion 22, and connects the second cylindrical portion 21 and the third cylindrical portion 22. The illustrated bent portion 23 is bent at a right angle. That is, in the second protector 2 of the present embodiment, the second cylindrical portion 21 and the third cylindrical portion 22 are orthogonal to each other.

The exterior member 3 is a flexible cylindrical member for housing and protecting the electric wire 4. The exterior member 3 is molded from, for example, an insulating synthetic resin. As illustrated in FIGS. 3 and 4, the exterior member 3 can be flexurally deformed so as to curve a central axis C1 in plan view. The exterior member 3 has rigidity in a direction along the central axis C1.

The exterior member 3 may be, for example, a member having a rectangular cylindrical shape configured to be bendable. Such an exterior member having a rectangular cylindrical shape is provided with, for example, a plurality of cut lines so as to be bendable. The exterior member having a rectangular cylindrical shape can be flexurally deformed while maintaining the length along the direction of the central axis C1.

The exterior member 3 may be configured by arranging a plurality of frame members along the central axis C1. In such an exterior member 3, two adjacent frame members are coupled to each other so as to be relatively rotatable. The exterior member 3 of the coupling type can be flexurally deformed while maintaining the length along the direction of the central axis C1.

The exterior member 3 may be a corrugated tube. The corrugated tube is formed to have suitable rigidity along the central axis C1. The corrugated tube may be formed to be capable of flexural deformation while maintaining the length along the direction of the central axis C1.

The exterior member 3 has a first end portion 31 and a second end portion 32. The first end portion 31 is disposed on the first protector 1. The second end portion 32 is disposed on the second protector 2. In the wire harness WH of the present embodiment, the first end portion 31 is slidably inserted into the first protector 1, and the second end portion 32 is fixed to the second protector 2.

Here, in the link mechanism 100A of the present embodiment, the line length between the two links 110 and 120 changes as a result of the relative rotation of the second link 120 with respect to the first link 110. For example, when the first protector 1 is fixed to the vehicle body 160, the line length between the first protector 1 and the second protector 2 changes. In the rotation position illustrated in FIG. 2, the opening 11*a* of the first protector 1 and the opening 21*a* of the second protector 2 face each other, and the exterior member 3 has a straight shape. In this case, the line length between the first protector 1 and the second protector 2 is maximized.

On the other hand, in the fully closed rotation position illustrated in FIG. 3 and the fully open rotation position illustrated in FIG. 4, the direction of the opening 11*a* and the direction of the opening 21*a* intersect. In this case, the linear distance between the opening 11*a* and the opening 21*a* is shorter than in the case of the rotation position in FIG. 2. That is, the line length between the opening 11*a* and the opening 21*a* in the fully closed position and the fully open position is shorter than the line length in the case of the rotation position in FIG. 2.

As described below, the wire harness WH of the present embodiment has the movable structure 5 that reduces a load on the exterior member 3 due to the rotational operation of the second link 120. FIG. 6 illustrates the first protector 1, the second protector 2, the exterior member 3, and the electric wire 4 in the rotation position in FIG. 2. The movable structure 5 includes the first end portion 31 of the exterior member 3 and the first cylindrical portion 11 of the first protector 1.

More specifically, the movable structure 5 is a fitting structure in which the first end portion 31 and the first cylindrical portion 11 are slidably fitted. As illustrated in FIG. 6, the first end portion 31 of the exterior member 3 is inserted into the first cylindrical portion 11 so as to be slidable with respect to the first cylindrical portion 11. That is, the first end portion 31 is movable forward and backward with respect to the first cylindrical portion 11 along the axial direction of the first cylindrical portion 11. In the description below, the axial direction of the first cylindrical portion 11 is simply referred to as an axial direction AD.

The second end portion 32 of the exterior member 3 is fixed to the second cylindrical portion 21 of the second protector 2. The second end portion 32 is fixed to the second cylindrical portion 21 such that, for example, a distal end surface of the second end portion 32 abuts against a distal end surface of the second cylindrical portion 21.

As illustrated in FIGS. 1 and 5, the electric wire 4 is inserted through each of the first protector 1, the second protector 2, and the exterior member 3. The illustrated electric wire 4 connects a device on the vehicle body 160 side and a device on the door 150 side. The electric wire 4 is configured by, for example, bundling a power supply line and a signal line. One end of the electric wire 4 is led out from the opening 11*b* of the first protector 1. The electric wire 4 led out from the opening 11*b* is connected to a power source and a control device of the vehicle 100. The other end of the electric wire 4 is routed in the internal space 121 of the second link 120 and connected to a device disposed in the door 150. The electric wire 4 is routed in the second link 120 along the longitudinal direction of the second link 120.

The electric wire 4 is fixed on each of the vehicle body 160 side and the second link 120 side. An object to which the electric wire 4 on the vehicle body 160 side is fixed is, for example, the first protector 1. The electric wire 4 is fixed to the first protector 1 by, for example, a binding member such as a band or a tape. An object to which the electric wire 4 on the second link 120 side is fixed is, for example, the second protector 2. The electric wire 4 is fixed to the second protector 2 by, for example, a binding member such as a band or a tape. For example, the electric wire 4 is fixed to the second protector 2 at the portion of the opening 22*a*.

FIG. 7 illustrates the second protector 2 and the electric wire 4 when the second link 120 is in the fully closed position. As described above, in the fully closed position and the fully open position, the line length between the first protector 1 and the second protector 2 becomes short. For example, when the second link 120 rotates from the half-open position toward the fully closed position, as illustrated in FIG. 7, a force F1 toward the first protector 1 side along the axial direction AD acts on the exterior member 3.

The first end portion 31 of the exterior member 3 is pushed toward the inside of the first cylindrical portion 11 by the force F1. That is, the first end portion 31 moves relative to the first link 110 along the axial direction AD. The exterior member 3 follows the second link 120 rotating toward the fully closed position by moving toward the back side of the first cylindrical portion 11 while sliding with respect to the first cylindrical portion 11. Since the exterior member 3 is slidable with respect to the first cylindrical portion 11, the load on the exterior member 3 due to a change in line length is reduced.

As a comparative example, a configuration in which the first end portion 31 is fixed to the first cylindrical portion 11 in a non-slidable manner will be examined. In this case, a stress in the axial direction is generated in the exterior member 3 as a result of the rotation of the second link 120. Further, the exterior member 3 needs to be flexurally deformed to follow the rotation of the second link 120. As a result, a large load may be applied to the exterior member 3 by the rotational operation of the link mechanism 100A. On the other hand, in the wire harness WH of the present embodiment, the stress generated in the exterior member 3 can be reduced by the movable structure 5.

FIG. 8 illustrates the first protector 1 and the exterior member 3 when the second link 120 is in the fully open position. When the second link 120 rotates from the half-open position toward the fully open position, as illustrated in FIG. 8, a force F2 toward the first protector 1 side along the axial direction AD acts on the exterior member 3.

The first end portion 31 of the exterior member 3 is pushed toward the inside of the first cylindrical portion 11 by the force F2. The exterior member 3 follows the second link 120 rotating toward the fully open position by moving toward the back side of the first cylindrical portion 11 while sliding with respect to the first cylindrical portion 11. Thus, the movable structure 5 can reduce the stress of the exterior member 3 when the second link 120 rotates toward the fully open position.

When the second link 120 rotates from the fully closed position or the fully open position toward the half-open position illustrated in FIG. 2, the line length between the first protector 1 and the second protector 2 becomes long. In this case, a force in a direction opposite to the forces F1 and F2 acts on the exterior member 3. Thus, the first end portion 31 of the exterior member 3 slides with respect to the first cylindrical portion 11 in a direction of coming out of the first cylindrical portion 11. That is, the exterior member 3 follows the second link 120 rotating toward the half-open position by sliding with respect to the first cylindrical portion 11 so as to be away from the opening 11*b*.

As described above, the fitting structure including the first end portion 31 and the first cylindrical portion 11 accommodates a change in line length caused by the rotation of the second link 120. Thus, the wire harness WH of the present embodiment can reduce the load on the exterior member 3 due to the rotational operation of the link mechanism 100A.

In addition, the wire harness WH of the present embodiment can, as described below, accommodate the extra length generated in the electric wire 4. FIG. 9 illustrates a cross section of the second protector 2 in the fully open position illustrated in FIG. 4.

As illustrated in FIG. 9, the third cylindrical portion 22 of the second protector 2 has an inner wall 22*b* and an outer wall 22*c*. The inner wall 22*b* and the outer wall 22*c* face each other in a longitudinal direction LD of the second link 120. That is, the inner wall 22*b* and the outer wall 22*c* face each other in a radial direction when the second link 120 performs the rotational movement. The inner wall 22*b* is positioned closer to the rotation shaft 140 than the outer wall 22*c* to the rotation shaft 140. That is, the inner wall 22*b* is positioned closer to the center side in the radial direction described above than the outer wall 22*c* to the center side.

A distance W1 between the inner wall 22*b* and the outer wall 22*c* is larger than the diameter of the electric wire 4. Accordingly, the electric wire 4 can extend in a direction inclined with respect to the vehicle up-down direction Z inside the third cylindrical portion 22.

The second protector 2 is configured to be able to house an extra length of the electric wire 4 generated when the second link 120 rotates. When the second link 120 is in the fully open position, as illustrated in FIG. 9, the electric wire 4 extends along the outer wall 22*c*. At this time, a gap exists between the electric wire 4 and the inner wall 22*b*. When the second link 120 is in the fully closed position, the electric wire 4 is housed in the second protector 2 in a shape similar to the shape illustrated in FIG. 9.

When the second link 120 rotates toward the half-open position, the line length between the first protector 1 and the second protector 2 increases. In this case, the electric wire 4 is inclined inside the second protector 2 as indicated by the broken lines in FIG. 9. More specifically, the electric wire 4 is inclined with respect to the vehicle up-down direction Z so as to approach the outer wall 22*c* toward the opening 22*a* inside the third cylindrical portion 22. That is, the electric wire 4 can move as indicated by an arrow AR1 according to the rotation of the second link 120.

When the electric wire 4 approaches the outer wall 22*c* along the longitudinal direction LD, the extra length of the electric wire 4 is housed in the second protector 2. On the other hand, when the electric wire 4 approaches the inner wall 22*b* along the longitudinal direction LD, the extra length of the electric wire 4 is let out from the second protector 2 to the exterior member 3. That is, the second protector 2 can accommodate the extra length generated in the electric wire 4 by allowing deformation and movement of the electric wire 4 inside the second protector 2, and can let out the extra length of the electric wire 4.

When the second protector 2 accommodates the extra length of the electric wire 4 as described above, the exterior member 3 and the electric wire 4 can follow the rotation of the second link 120 independently of each other. The exterior member 3 follows the second link 120 by sliding with respect to the first protector 1. On the other hand, the electric wire 4 follows the second link 120 by housing the extra length inside the second protector 2. Since the exterior member 3 and the electric wire 4 follow the second protector 2 independently of each other, the followability of the wire harness WH with respect to the rotational operation of the link mechanism 100A is improved.

Note that it is desirable that the electric wire 4 is slidably inserted into the exterior member 3. With such a configuration, the electric wire 4 does not hinder the following movement of the exterior member 3, and the exterior member 3 does not hinder the following movement of the electric wire 4.

Note that the housing space for housing the extra length of the electric wire 4 may be provided in the routing path on the first link 110 side. For example, the internal space of the first protector 1 may house the extra length of the electric wire 4 as the housing space. The housing space may be provided in any one of the routing path on the first link 110 side and the routing path on the second link 120 side, or may be provided in both the routing paths.

As described above, the wire harness WH of the present embodiment includes the first protector 1, the second protector 2, the exterior member 3 having a flexible cylindrical shape, the electric wire 4, and the movable structure 5. The first protector 1 is disposed on the fixed first link 110 and has the first cylindrical portion 11. The second protector 2 is disposed on the second link 120 that is relatively rotatable with respect to the first link 110. The exterior member 3 includes the first end portion 31 disposed in the first cylindrical portion 11 and the second end portion 32 disposed in the second protector 2. The electric wire 4 is inserted through each of the first cylindrical portion 11, the second protector 2, and the exterior member 3, and is routed in the second link 120.

The movable structure 5 allows the first end portion 31 to relatively move along the axial direction AD of the first cylindrical portion 11 with respect to the first link 110. The movable structure 5 can accommodate a change in line length due to the rotational operation of the link mechanism 100A and reduce the load on the exterior member 3.

The movable structure 5 of the present embodiment is a fitting structure in which the first end portion 31 and the first cylindrical portion 11 are slidably fitted. The slidable fitting structure can achieve smooth followability with respect to the rotational operation of the link mechanism 100A. Note that, in the fitting structure of the present embodiment, the first end portion 31 is inserted into the first cylindrical portion 11, but conversely, the first cylindrical portion 11 may be inserted into the first end portion 31.

The exterior member 3 is configured to be flexurally deformed while maintaining the length along the direction of the central axis C1 of the exterior member 3. Since the exterior member 3 has rigidity in the axial direction, the movable structure 5 functions appropriately, and the load on the exterior member 3 is reduced.

Second Embodiment

Figure 10:
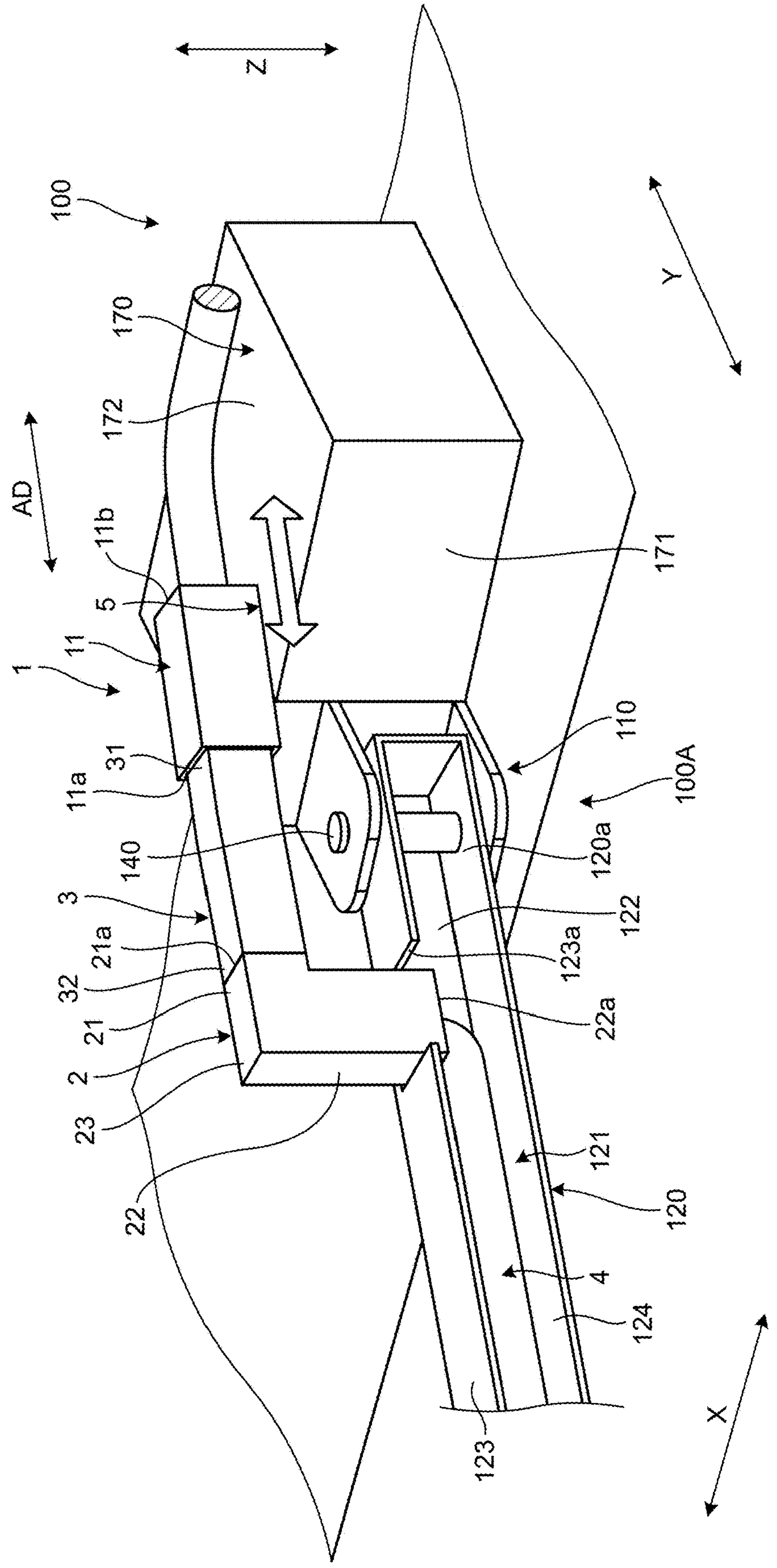
FIG. 10 is a perspective diagram describing a movable structure according to a second embodiment.

A second embodiment will be described with reference to FIG. 10. In the second embodiment, components having functions similar to those described in the first embodiment described above are denoted by the same reference numerals, and redundant description is omitted. FIG. 10 is a perspective diagram describing the movable structure according to the second embodiment. The second embodiment is different from the first embodiment described above in that, for example, the first protector 1 is slidable with respect to the first link 110.

The movable structure 5 of the second embodiment is a slide structure that allows the first cylindrical portion 11 to move relative to the first link 110 along the axial direction AD. The support portion 170 supports the first protector 1 so that the first protector 1 can relatively move along the axial direction AD. The support portion 170 may be provided with a guide groove or a guide rail that guides the first protector 1 along the axial direction AD. In this case, the first protector 1 is preferably provided with a rib corresponding to the guide groove and a recess corresponding to the guide rail.

In the second embodiment, the first end portion 31 of the exterior member 3 is fixed to the first cylindrical portion 11. The first cylindrical portion 11 and the first end portion 31 are fixed so as to be relatively immovable by, for example, an engagement structure having a protrusion and a recess.

When the line length between the first link 110 and the second link 120 changes as a result of the rotation of the second link 120, the first protector 1 slides with respect to the support portion 170. That is, the first protector 1 slides along the axial direction AD with respect to the first link 110. Such a slide structure can reduce the load on the exterior member 3 due to the rotational operation of the link mechanism 100A.

The wire harness WH of the second embodiment has a configuration to accommodate the extra length of the electric wire 4 generated as a result of the rotation of the second link 120. Similarly to the first embodiment described above, the second protector 2 may house the extra length of the electric wire 4. The extra length of the electric wire 4 may be accommodated by the routing path on the first link 110 side.

As described above, the movable structure 5 of the second embodiment is a slide structure that allows the first cylindrical portion 11 of the first protector 1 to move relative to the first link 110 along the axial direction AD. Such a slide structure can reduce the load on the exterior member 3 due to the rotational operation of the link mechanism 100A.

Note that the link mechanism 100A to which the wire harness WH of the first embodiment and the second embodiment is applied is not limited to a mechanism for opening and closing the door 150. The link mechanism 100A is not limited to a mechanism mounted on the vehicle 100.

The contents disclosed in the embodiments described above can be appropriately combined and executed.

A wire harness according to the present embodiments has a movable structure that allows a first end portion of an exterior member to relatively move along an axial direction of a first cylindrical portion with respect to a first link. The wire harness of the present invention provides an effect of being capable of reducing a load on the exterior member due to the rotational operation of the link mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:

a first protector that is disposed on a first link that is fixed to a vehicle body, and includes a first cylindrical portion;

a second protector that is disposed on a second link rotatable relative to the first link via a rotation shaft;

a flexible exterior member having a cylindrical shape and configured to be bendable that includes a first end portion disposed in the first cylindrical portion and a second end portion disposed in the second protector;

an electric wire that is inserted through each of the first protector, the second protector, and the exterior member and is routed in the second link; and a movable structure including the first end portion of the exterior member and the first cylindrical portion of the first protector, the movable structure allowing the first end portion to move relative to the first link along an axial direction of the first cylindrical portion.

2. The wire harness according to claim 1, wherein the movable structure is a fitting structure in which the first end portion and the first cylindrical portion are slidably fitted.

3. The wire harness according to claim 1, wherein the movable structure is a slide structure that allows the first cylindrical portion to move relative to the first link along the axial direction.

4. The wire harness according to claim 1, wherein the exterior member is configured to be flexurally deformed while substantially maintaining a length along an axial direction of the exterior member.

5. The wire harness according to claim 2, wherein the exterior member is configured to be flexurally deformed while substantially maintaining a length along an axial direction of the exterior member.

6. The wire harness according to claim 3, wherein the exterior member is configured to be flexurally deformed while substantially maintaining a length along an axial direction of the exterior member.

7. The wire harness according to claim 1, wherein the movable structure allowing the first end portion to move relative to the first link along the axial direction of the first cylindrical portion is configured to allow the first end portion to move relative to the first link along the axial direction of the first cylindrical portion by holding the first end portion therein the first cylindrical portion as the second link rotates relative to the first link.

8. The wire harness according to claim 2, wherein the fitting structure, as the movable structure including the first end portion of the exterior member and the first cylindrical portion of the first protector, includes the first end portion and the first cylindrical portion as slidably fitted by the first cylindrical portion being configured to receive the first end portion as slid therein the first cylindrical portion, and the first end portion is arranged within the first cylindrical portion.

9. The wire harness according to claim 3, wherein the slide structure, as the movable structure including the first end portion of the exterior member and the first cylindrical portion of the first protector, includes the first end portion and the first cylindrical portion as slidably fitted by the first cylindrical portion being configured to receive the first end portion as slid therein the first cylindrical portion, and the first end portion is arranged within the first cylindrical portion.

* * * * *